United States Patent
Harnik et al.

(10) Patent No.: US 10,394,846 B2
(45) Date of Patent: Aug. 27, 2019

(54) HETEROGENEOUS COMPRESSION IN REPLICATED STORAGE

(71) Applicant: INTERNATIONAL BUSINESS MACHINES CORPORATION, Armonk, NY (US)

(72) Inventors: Danny Harnik, Tel Mond (IL); Ety Khaitzin, Holon (IL); Sergey Marenkov, Tel Aviv (IL); Dmitry Sotnikov, Givataim (IL)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 501 days.

(21) Appl. No.: 14/835,241

(22) Filed: Aug. 25, 2015

(65) Prior Publication Data
US 2017/0060976 A1    Mar. 2, 2017

(51) Int. Cl.
*G06F 16/00* (2019.01)
*G06F 16/27* (2019.01)
*G06F 16/24* (2019.01)
*G06F 16/174* (2019.01)

(52) U.S. Cl.
CPC ........ *G06F 16/273* (2019.01); *G06F 16/1744* (2019.01); *G06F 16/24* (2019.01)

(58) Field of Classification Search
CPC ........ G06F 17/30386; G06F 17/30578; G06F 16/1744; G06F 16/24; G06F 16/273
See application file for complete search history.

(56) References Cited

U.S. PATENT DOCUMENTS

| | | | |
|---|---|---|---|
| 8,849,758 B1* | 9/2014 | Sivasubramanian | G06F 17/30595 707/636 |
| 2005/0097413 A1* | 5/2005 | Ravi | G01R 31/318547 714/724 |
| 2005/0273654 A1* | 12/2005 | Chen | G06F 11/2082 714/13 |
| 2012/0011337 A1* | 1/2012 | Aizman | G06F 11/1076 711/162 |
| 2012/0150802 A1* | 6/2012 | Popov | G06F 11/1487 707/635 |

FOREIGN PATENT DOCUMENTS

| | | |
|---|---|---|
| EP | 2538355 A1 | 6/2012 |
| WO | 9708661 A2 | 3/1997 |
| WO | 9914673 A1 | 3/1999 |

OTHER PUBLICATIONS

Gong et al., MLOC: Multi-level Layout Optimization Framework for Compressed Scientific Data Exploration with Heterogeneous Access Patterns, 10 pages.

Joukov et al., Increasing Distributed Storage Survivability with a Stackable RAID-like File Systempages 1-8, Proceedings of the 2005 IEEE/ACM Workshop on Cluster Security in conjunction with the Fifth IEEE/ACM International Symposium on Cluster Computing and the Grid (CCGrid 2005).

* cited by examiner

*Primary Examiner* — Dinku W Gebresenbet
(74) *Attorney, Agent, or Firm* — Griffiths & Seaton PLLC

(57) ABSTRACT

Various embodiments for data management in a replicated storage environment, by a processor device, are provided. In one embodiment, a method comprises storing a plurality of data replicas under a plurality of heterogeneous compression algorithms, wherein one of the data replicas is optimized for a data operation.

15 Claims, 4 Drawing Sheets

HETEROGENEOUS COMPRESSION IN REPLICATED STORAGE

BACKGROUND OF THE INVENTION

Field of the Invention

The present invention relates in general to computing systems, and more particularly, to various embodiments for data management including heterogeneous compression in a replicated storage environment.

Description of the Related Art

In today's society, computer systems are commonplace. Computer systems may be found in the workplace, at home, or at school. Computer systems may include data storage systems, or disk storage systems, to process and store data. Data storage systems, or disk storage systems, are utilized to process and store data. A storage system may include one or more disk drives. These data processing systems typically require a large amount of data storage. Customer data, or data generated by users within the data processing system, occupies a great portion of this data storage. Many of these computer systems include virtual storage components. Data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. However, data compression may consume a significant amount of computing (e.g. central processing unit "CPU") resources. Compression may be used in a variety of different environments, including clustered or distributed environments. Due to data reliability concerns, many clustered and distributed systems replicate data over a number clustered storage controllers. The replication may be at a block level, a file level or an object level, depending on the storage type and model being used. Additionally, the level of replication (i.e. the number of copies replicated) varies between systems, depending on hardware stability and required reliability.

SUMMARY OF THE INVENTION

Various embodiments for data management in a replicated storage environment, by a processor device, are provided. In one embodiment, a method comprises storing a plurality of data replicas under a plurality of heterogeneous compression algorithms, wherein one of the data replicas is optimized for a data operation.

In addition to the foregoing exemplary embodiment, various other system and computer program product embodiments are provided and supply related advantages. The foregoing summary has been provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

BRIEF DESCRIPTION OF THE DRAWINGS

In order that the advantages of the invention will be readily understood, a more particular description of the invention briefly described above will be rendered by reference to specific embodiments that are illustrated in the appended drawings. Understanding that these drawings depict only typical embodiments of the invention and are not therefore to be considered to be limiting of its scope, the invention will be described and explained with additional specificity and detail through the use of the accompanying drawings, in which.

DETAILED DESCRIPTION OF THE DRAWINGS

Figure 1:
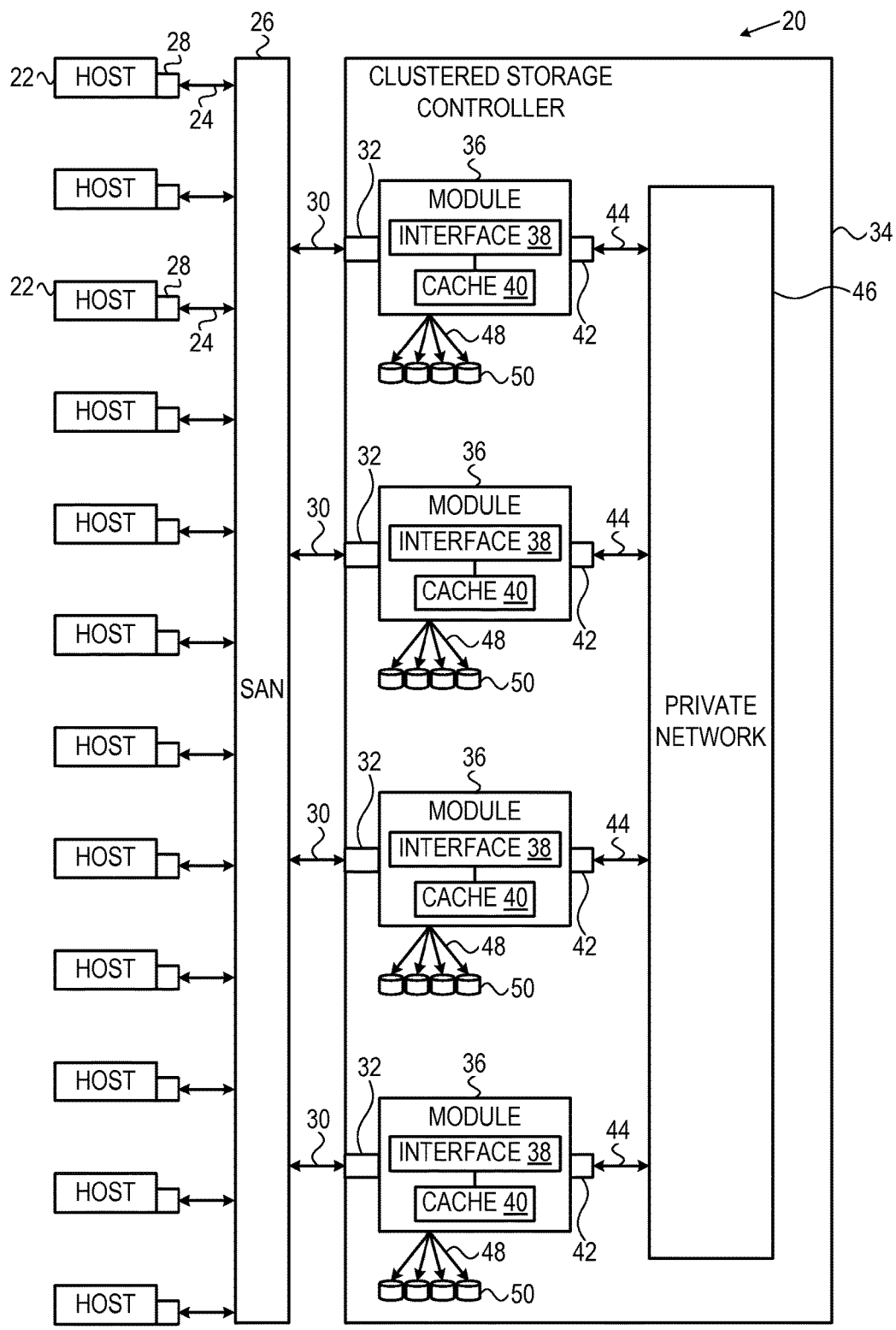
FIG. 1 illustrates a block diagram illustrating a computer storage environment having an exemplary storage device in which aspects of the present invention may be realized.

Described embodiments, and illustrative Figures of a method for data management in a replicated storage environment are to follow. In the interest of clarity, not all features of an actual implementation are described in this Specification. It will of course be appreciated by the skilled artisan, that in the development of any such actual embodiment, numerous implementation-specific decisions must be made to achieve the developers' specific goals, such as compliance with system-related and business-related constraints, which will vary from one implementation to another. Furthermore, it will be appreciated that such a development effort may be complex and labor-intensive, but would nevertheless be a routine undertaking for those of ordinary skill in the art having the benefit of this Disclosure.

As aforementioned, data compression is widely used to reduce the amount of data required to process, transmit, or store a given quantity of information. Data compression is the coding of data to minimize its representation. Compression can be used, for example, to reduce the storage requirements for files, to increase the communication rate over a channel, or to reduce redundancy prior to encryption for greater security. However, data compression may consume a significant amount of computing (e.g. central processing unit "CPU") resources. Compression may be used in a variety of different environments, including clustered or distributed environments. Due to data reliability concerns, many clustered and distributed systems replicate data over a number clustered storage controllers. The replication may be at a block level, a file level or an object level, depending on the storage type and model being used. Additionally, the level of replication (i.e. the number of copies replicated) varies between systems, depending on hardware stability and required reliability.

The effectiveness of data compression varies significantly on factors such as the type of compression being used, the type of data undergoing the compression, data access patterns, and latency expectations when reading or writing data. For example, small random reads generally are inefficient when under compression. Many compression methods process chunks of data (e.g. 32 KB), and when a smaller amount is to be read (e.g. 4 KB), the entire chunk of data must be read to extract and return only the small read. This means in many cases, the amount of data actually read and decompressed from the disk may be substantially larger than what is necessary, creating a considerable overhead burden for random read workloads on the overall storage system environment. Large object sequential reads, however, may actually benefit and become more efficient by being compressed, such as if the data is highly compressible and the overall disk speed creates a bottleneck. This scenario provides a faster overall read by reading significantly less data and decompressing it than processing a large read with no decompression processing involved.

In another example, a trade-off must often be made between the energy and time to process the data compression/decompression and the space savings it provides. There exist many various types of compressors in computing environments today. Fast compressors focus more upon the speed of the compression versus the compression ratio. Standard compressors focus on saving more disk space at the price of a higher compression and decompression effort to process data. A delicate balance must be achieved of overall disk space savings and effort required to compress/decompress and throughput data.

In view of the foregoing, the mechanisms of the illustrated embodiments provide various solutions to previous challenges for data management using heterogeneous compression in a replicated storage environment. These mechanisms include such functionality as storing a plurality of data replicas under a plurality of heterogeneous compression algorithms, as will be further described.

The mechanisms may be applicable to a variety of network topologies and network components as will be further described. Notwithstanding the illustration of some of the functionality attendant to the various embodiments, one of ordinary skill will appreciate that the methodologies herein may be adapted to a wide variety of implementations and scenarios as noted above.

Turning now to FIG. 1, a schematic pictorial illustration of a data processing storage subsystem 20 is shown, in accordance with a disclosed embodiment of the invention. The particular subsystem shown in FIG. 1 is presented to facilitate an explanation of the invention. However, as the skilled artisan will appreciate, the invention can be practiced using other computing environments, such as other storage subsystems with diverse architectures and capabilities.

Storage subsystem 20 receives, from one or more host computers 22, input/output (I/O) requests, which are commands to read or write data at logical addresses on logical volumes. Any number of host computers 22 are coupled to storage subsystem 20 by any means known in the art, for example, using a network. Herein, by way of example, host computers 22 and storage subsystem 20 are assumed to be coupled by a Storage Area Network (SAN) 26 incorporating data connections 24 and Host Bus Adapters (HBAs) 28. The logical addresses specify a range of data blocks within a logical volume, each block herein being assumed by way of example to contain 512 bytes. For example, a 10 KB data record used in a data processing application on a given host computer 22 would require 20 blocks, which the given host computer might specify as being stored at a logical address comprising blocks 1,000 through 1,019 of a logical volume. Storage subsystem 20 may operate in, or as, a SAN system.

Storage subsystem 20 comprises a clustered storage controller 34 coupled between SAN 26 and a private network 46 using data connections 30 and 44, respectively, and incorporating adapters 32 and 42, again respectively. In some configurations, adapters 32 and 42 may comprise host SAN adapters (HSAs). Clustered storage controller 34 implements clusters of storage modules 36, each of which includes an interface 38 (in communication between adapters 32 and 42), and a cache 40. Each storage module 36 is responsible for a number of storage devices 50 by way of a data connection 48 as shown.

As described previously, each storage module 36 further comprises a given cache 40. However, it will be appreciated that the number of caches 40 used in storage subsystem 20 and in conjunction with clustered storage controller 34 may be any convenient number. While all caches 40 in storage subsystem 20 may operate in substantially the same manner and comprise substantially similar elements, this is not a requirement. Each of the caches 40 may be approximately equal in size and is assumed to be coupled, by way of example, in a one-to-one correspondence with a set of physical storage devices 50, which may comprise disks. In one embodiment, physical storage devices may comprise such disks. Those skilled in the art will be able to adapt the description herein to caches of different sizes.

Each set of storage devices 50 comprises multiple slow and/or fast access time mass storage devices, herein below assumed to be multiple hard disks. FIG. 1 shows caches 40 coupled to respective sets of storage devices 50. In some configurations, the sets of storage devices 50 comprise one or more hard disks, which can have different performance characteristics. In response to an I/O command, a given cache 40, by way of example, may read or write data at addressable physical locations of a given storage device 50. In the embodiment shown in FIG. 1, caches 40 are able to exercise certain control functions over storage devices 50. These control functions may alternatively be realized by hardware devices such as disk controllers (not shown), which are linked to caches 40.

Each storage module 36 is operative to monitor its state, including the states of associated caches 40, and to transmit configuration information to other components of storage subsystem 20 for example, configuration changes that result in blocking intervals, or limit the rate at which I/O requests for the sets of physical storage are accepted.

Routing of commands and data from HBAs 28 to clustered storage controller 34 and to each cache 40 may be performed over a network and/or a switch. Herein, by way of example, HBAs 28 may be coupled to storage modules 36 by at least one switch (not shown) of SAN 26, which can be of any known type having a digital cross-connect function. Additionally, or alternatively, HBAs 28 may be coupled to storage modules 36.

In some embodiments, data having contiguous logical addresses can be distributed among modules 36, and within the storage devices in each of the modules. Alternatively, the data can be distributed using other algorithms, e.g., byte or block interleaving. In general, this increases bandwidth, for instance, by allowing a volume in a SAN or a file in network attached storage to be read from or written to more than one given storage device 50 at a time. However, this technique requires coordination among the various storage devices, and in practice may require complex provisions for any failure of the storage devices, and a strategy for dealing with error checking information, e.g., a technique for storing parity information relating to distributed data. Indeed, when logical unit partitions are distributed in sufficiently small granularity, data associated with a single logical unit may span all of the storage devices 50.

While not explicitly shown for purposes of illustrative simplicity, the skilled artisan will appreciate that in some embodiments, clustered storage controller 34 may be adapted for implementation in conjunction with certain hardware, such as a rack mount system, a midplane, and/or a backplane. Indeed, private network 46 in one embodiment may be implemented using a backplane. Additional hardware such as the aforementioned switches, processors, controllers, memory devices, and the like may also be incorporated into clustered storage controller 34 and elsewhere within storage subsystem 20, again as the skilled artisan will appreciate. Further, a variety of software components, operating systems, firmware, and the like may be integrated into one storage subsystem 20.

Figure 2:
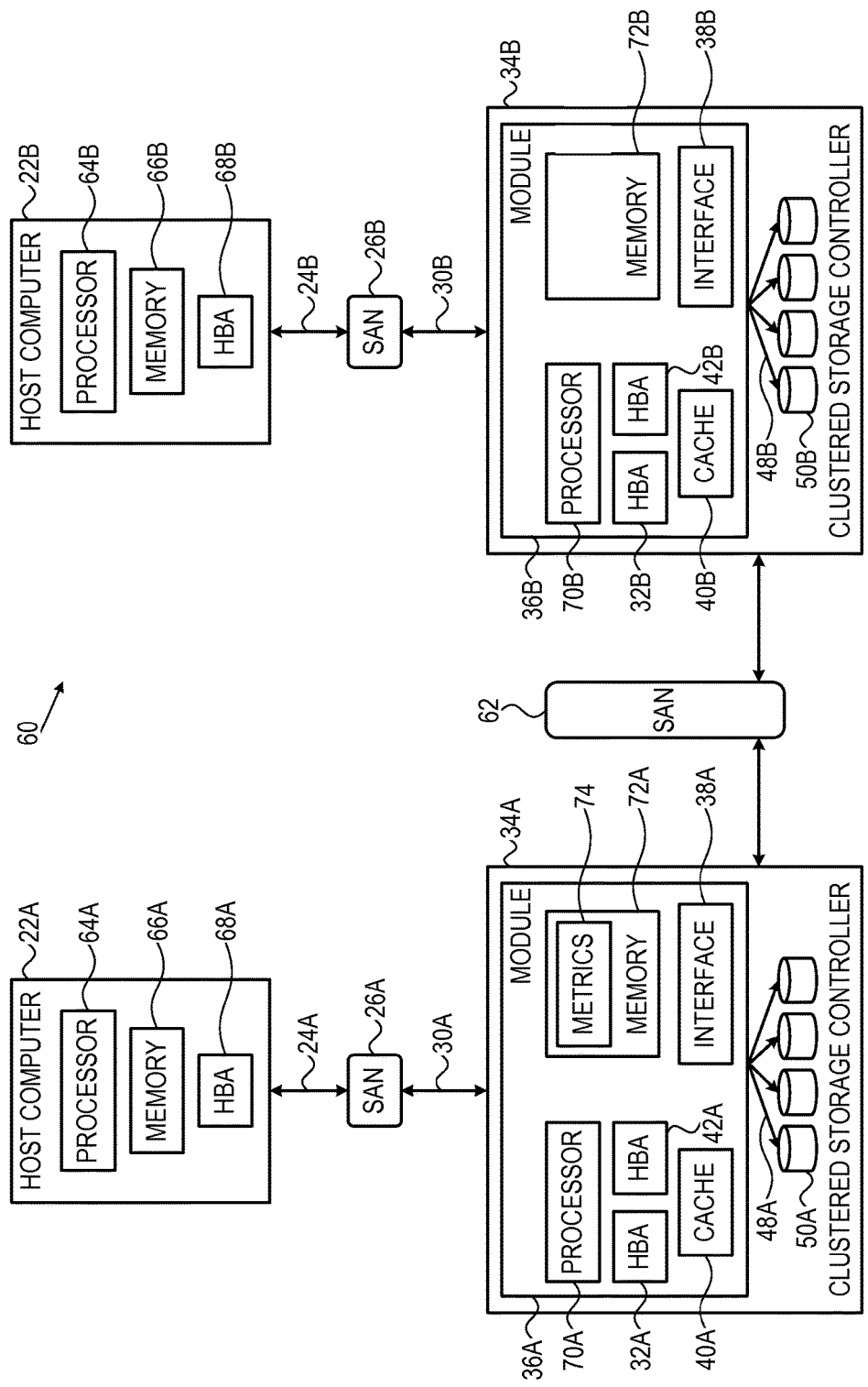
FIG. 2 illustrates a block diagram illustrating a hardware structure of an exemplary data storage system in a computer system in which aspects of the present invention may be realized.

FIG. 2 is a schematic pictorial illustration of facility 60 configured to perform host computer monitoring, in accordance with an embodiment of the present invention. In the description herein, host computers 22, storage controllers 34 and their respective components may be differentiated by appending a letter to the identifying numeral, so that facility 60 comprises a first host computer 22A (also referred to herein as a primary host computer) coupled to a clustered storage controller 34A via a SAN 26A, and a second host computer 22B (also referred to herein as a secondary host computer) coupled to a clustered storage controller 34B via a SAN 26B. In the configuration shown in FIG. 2 storage controllers 34A and 34B are coupled via a facility SAN 62.

Host computer 22A comprises a processor 64A, a memory 66A, and an adapter 68A. Adapter 68A is coupled to SAN 26A via a data connection 24A.

As described supra, module 36A is coupled to storage devices 50A via data connections 48A, and comprises adapters 32A and 42A, a cache 40A, and an interface 38A. Module 36A also comprises a processor 70A and a memory 72A. As explained in detail hereinbelow, processor 70A is configured to establish metrics 74 that indicate a connectivity status of host computer 22A, and store the metrics to memory 72A. In some embodiments, processor 70A may store metrics 74 to storage devices 50A.

Host computer 22B comprises a processor 64B, a memory 66B, and an adapter 68B. Adapter 68B is coupled to SAN 26B via a data connection 24B.

As described supra, module 36B is coupled to storage devices 50B via data connections 48B, and comprises adapters 32B and 42B, a cache 40B, and an interface 38B. Module 36B also comprises a processor 70A and a memory 72B.

Processors 64A, 64B, 70A and 70B typically comprise general-purpose computers, which are programmed in software to carry out the functions described herein. The software may be downloaded to host computers 22A and 22B and modules 36A and 36B in electronic form, over a network, for example, or it may be provided on non-transitory tangible media, such as optical, magnetic or electronic memory media. Alternatively, some or all of the functions of the processors may be carried out by dedicated or programmable digital hardware components, or using a combination of hardware and software elements.

Examples of adapters 32A, 32B, 42A, 42B, 68A and 68B, include switched fabric adapters such as Fibre Channel (FC) adapters, Internet Small Computer System Interface (iSCSI) adapters, Fibre Channel over Ethernet (FCoE) adapters and Infiniband™ adapters.

While the configuration shown in FIG. 2 shows storage host computers 22A and 22B coupled to storage controllers 34A and 34B via SANs 26A and 26B, other configurations are to be considered within the spirit and scope of the present invention. For example, host computers 22A and 22B can be coupled to a single storage controller 34 via a single SAN 26.

Figure 3:
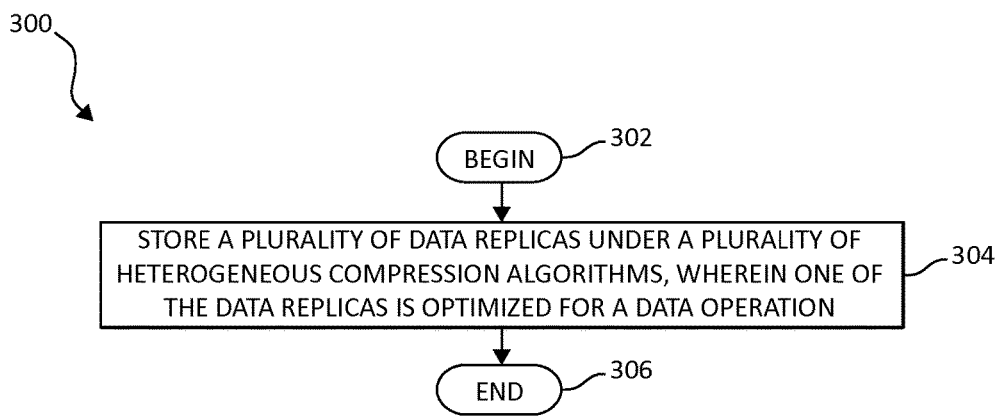
FIG. 3 illustrates a flow chart of a method for data management in a replicated storage environment.

As aforementioned, the mechanisms of the illustrated embodiments, among other functionality, provide the ability to store a plurality of data replicas under a plurality of heterogeneous compression algorithms. Continuing to FIG. 3, a method 300 of one embodiment of the present invention illustrates the methodologies herein. Beginning at step 302, a plurality of data replicas are stored under a plurality of heterogeneous compression algorithms, in which one of the data replicas is optimized for a data operation (step 304). The method ends (step 306).

In one embodiment, various compressed or uncompressed forms of different replicas of the same data are stored within the replicated storage environment. The various replicas serve data optimized based upon an access pattern or access request of the data requestor. In other words, different replicas of the same data are stored under different compression methods or uncompressed within the storage environment. The replica most efficient for the data read at hand is served based upon a pattern of reads, or the type of read being requested (i.e. long read or short read). The read operation is redirected to the appropriate replica which would provide the most efficient read under the individual circumstances.

In one embodiment, since replicated storage systems often carry three distinct copies of the same data, two of the three replicas may be compressed each in different form (i.e. a fast compression method and a standard compression method), and one replica left uncompressed. All small or short reads may then be directed to the uncompressed replica while large or long reads may then be directed to the compressed replica which would provide the most efficient readout for the individual circumstances at hand. This may be generalized to the formula of k out of n compressed replicas, where the ratio between compressed and uncompressed data is such that k is the largest that will still leave enough uncompressed replicas to handle the workload of all the small reads.

In another embodiment, all of the three replicas may be placed under compression, with the replica which would otherwise be left uncompressed being compressed by a fast compression method and small chunk size. This entails a lower compression ratio for the replica, however, a much faster handling time and effort of small or short random reads. The chosen compression/non-compression methods may be chosen for each data replica based upon characteristics of the individual storage system, read patterns, read requests, etc., and may be changed to accommodate the various needs according to the implementation.

In one example, data may be requested by a remote client in compressed form, such as a cloud storage that allows RESTfull access to objects using a web browser that supports http compression. All modern web browsers support standard Zip compression, which is generally very space efficient, albeit at the cost of a higher CPU overhead. Keeping data in a such a compatible format allows for space and bandwidth efficiency by simply forwarding the compressed data to the remote end client. However, if data is requested uncompressed, then the cloud server must decompress the data locally and deliver the data in the clear. Such CPU overhead may be too expensive for the cloud server when a large number of simultaneous read operations are invoked. Using the mechanisms of the present invention, some of the replicas may be stored compressed using a fast compressor (e.g. Snappy, Lz4) where decompression speeds are significantly better. Requests for compressed objects may then be redirected to the replicas with high end standard compression while all requests for uncompressed data may be redirected to replicas encoded using a fast compressor.

There are many various examples of systems that may benefit from the mechanisms of the present invention, one non-exclusive example being a cloud object storage (e.g.

OpenStack SWIFT) which, again, typically holds three replicas of each data object. Read operations are received by a proxy and redirected to a node holding a replica of the data object requested. In one embodiment, a middleware proxy re-direction mechanism may be built into the existing proxy mechanism to observe each read operation for simple characteristics, thereby redirecting the data operation to the most efficient replica type based upon read request metadata.

Figure 4:
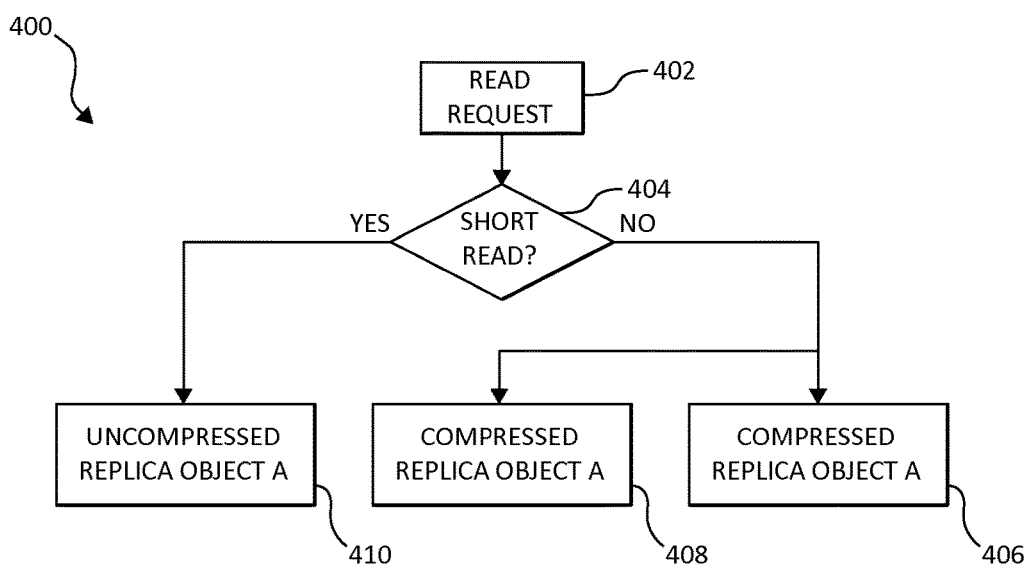
FIG. 4 illustrates a data read operation according to one aspect of an implementation of the present invention.

With the aforementioned methodology in view, FIG. 4 illustrates one embodiment of a data read operation 400 using the functionality of the present invention. Shown is a client read request 402, a middleware proxy mechanism 404 for determining the type of read, two replicas of the same data object compressed under separate compression methods 406, 408, and uncompressed replica object 410. Beginning at 402, a data read is requested by a client within the computing environment. A middleware proxy mechanism 404 intercepts the read request to determine characteristics of the data read (e.g. if the data read request is a small or short read, or a large or longer read) based upon read request metadata. If a short data read is requested, the request is directed to uncompressed replica 410. If the read requested is not a short read, middleware proxy 404 directs the operation 400 to compressed replica 406 or compressed replica 408 based upon the characteristics of the data read.

Figure 5:
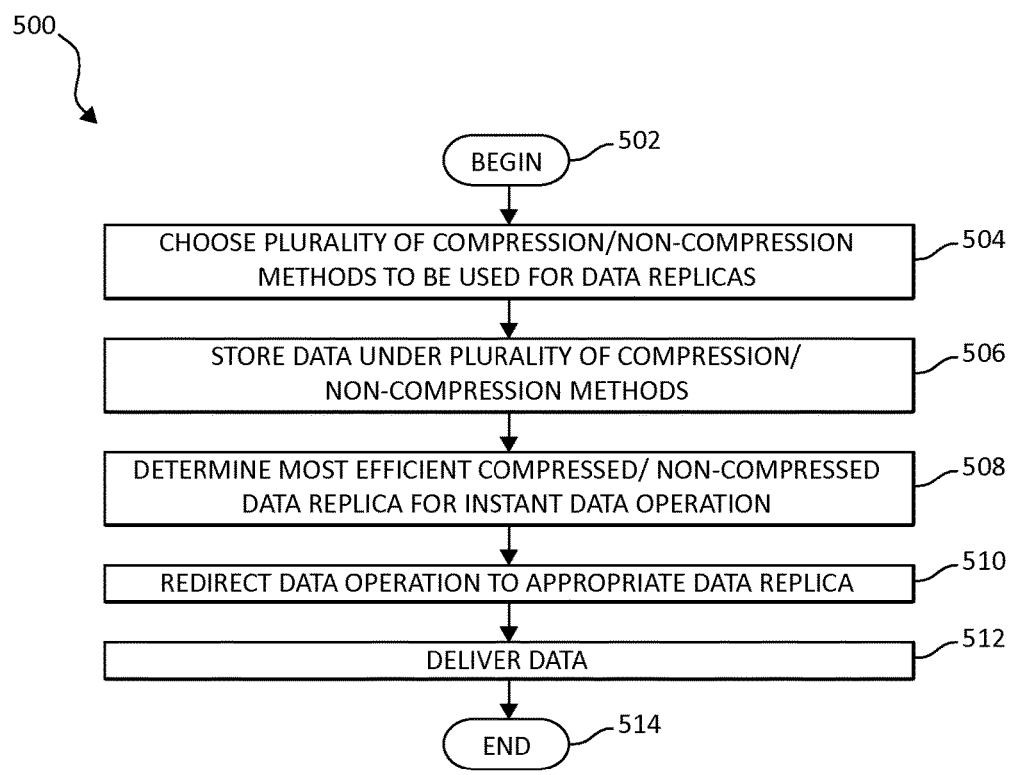
FIG. 5 illustrates an additional flow chart of a method for data management in a replicated storage environment.

FIG. 5 further illustrates the aforementioned methodologies with a method flow chart 500 of one embodiment of the present invention. Beginning at step 502, a plurality of compression/non-compression methods are chosen to be used for instances of data replicas based upon characteristics of the replicated storage system (step 504). The data replicas are stored under the chosen plurality of compression/non-compression algorithm methods within the storage system (step 506). The most efficient compressed/non-compressed replica is determined by a middleware proxy mechanism for the instant data operation based upon read request metadata (step 508). The data operation is then redirected by the middleware proxy mechanism to the appropriate data replica (step 510). The appropriate compressed/uncompressed data replica is then delivered to the client (step 514), and the method ends (step 514).

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While one or more embodiments of the present invention have been illustrated in detail, the skilled artisan will appreciate that modifications and adaptations to those embodiments may be made without departing from the scope of the present invention as set forth in the following claims.

What is claimed is:

1. A method for data management in a replicated storage environment, by a processor device, comprising:
storing a plurality of data replicas under a plurality of heterogeneous compression algorithms, wherein one of the data replicas is optimized for a data operation, the one of the data replicas optimized for the data operation identified by determining a first one of the data replicas stored under a first one of plurality of heterogeneous compression algorithms more efficiently executes the data operation when compared to performing the data operation using a second one of the data replicas stored under a second one of the plurality of heterogeneous compression algorithms; and
performing the data operation using the identified one of the data replicas optimized for the data operation; wherein the data operation is a data read operation and the identified one of the data replicas is chosen for the data read operation according to when metadata associated with a data read request for the data read operation indicates the data read request comprises a short random read and when the metadata indicates the data read request comprises a long sequential read such that the one of the plurality of heterogeneous compression algorithms the identified one of the data replicas is stored under is chosen to complete the data read operation according to whether the data read request comprises the short random read or the long sequential read.

2. The method of claim 1, further including storing at least one of the plurality of data replicas in uncompressed form.

3. The method of claim 1, further including providing the optimized data replica to the data read operation pursuant to the data read request based upon one of a data access pattern and a data access type.

4. The method of claim 3, further including adapting the plurality of data replicas according to statistics gathered on a previous data read request based upon one of the data access pattern and the data access type.

5. The method of claim 1, wherein the optimized data replica is provided by a middleware proxy mechanism, the middleware proxy mechanism re-directing the data read request to one of the optimized data replicas.

6. A system for data management in a replicated storage environment, comprising:
a processor device, wherein the processor device:
stores a plurality of data replicas under a plurality of heterogeneous compression algorithms, wherein one of the data replicas is optimized for a data operation, the one of the data replicas optimized for the data operation identified by determining a first one of the data replicas stored under a first one of plurality of heterogeneous compression algorithms more efficiently executes the data operation when compared to performing the data operation using a second one of the data replicas stored under a second one of the plurality of heterogeneous compression algorithms; and
performs the data operation using the identified one of the data replicas optimized for the data operation; wherein the data operation is a data read operation and the identified one of the data replicas is chosen for the data read operation according to when metadata associated with a data read request for the data read operation indicates the data read request comprises a short random read and when the metadata indicates the data read request comprises a long sequential read such that the one of the plurality of heterogeneous compression algorithms the identified one of the data replicas is stored under is chosen to complete the data read operation according to whether the data read request comprises the short random read or the long sequential read.

7. The system of claim 6, wherein the processor device stores at least one of the plurality of data replicas in uncompressed form.

8. The system of claim 6, wherein the processor device provides the optimized data replica to the data read operation pursuant to the data read request based upon one of a data access pattern and a data access type.

9. The system of claim 8, wherein the processor device adapts the plurality of data replicas according to statistics gathered on a previous data read request based upon one of the data access pattern and the data access type.

10. The system of claim 6, wherein the optimized data replica is provided by a middleware proxy mechanism, the middleware proxy mechanism re-directing the data read request to one of the optimized data replicas.

11. A computer program product for data management in a replicated storage environment, by a processor device, the computer program product comprising a non-transitory computer-readable storage medium having computer-readable program code portions stored therein, the computer-readable program code portions comprising:

a first executable portion that stores a plurality of data replicas under a plurality of heterogeneous compression algorithms, wherein one of the data replicas is optimized for a data operation, the one of the data replicas optimized for the data operation identified by determining a first one of the data replicas stored under a first one of plurality of heterogeneous compression algorithms more efficiently executes the data operation when compared to performing the data operation using a second one of the data replicas stored under a second one of the plurality of heterogeneous compression algorithms; and a second executable portion that performs the data operation using the identified one of the data replicas optimized for the data operation; wherein the data operation is a data read operation and the identified one of the data replicas is chosen for the data read operation according to when metadata associated with a data read request for the data read operation indicates the data read request comprises a short random read and when the metadata indicates the data read request comprises a long sequential read such that the one of the plurality of heterogeneous compression algorithms the identified one of the data replicas is stored under is chosen to complete the data read operation according to whether the data read request comprises the short random read or the long sequential read.

12. The computer program product of claim 11, further including a third executable portion that stores at least one of the plurality of data replicas in uncompressed form.

13. The computer program product of claim 11, further including a third executable portion that provides the optimized data replica to the data read operation pursuant to the data read request based upon one of a data access pattern and a data access type.

14. The computer program product of claim 13, further including a fourth executable portion that adapts the plurality of data replicas according to statistics gathered on a previous data read request based upon one of the data access pattern and the data access type.

15. The computer program product of claim 11, wherein the optimized data replica is provided by a middleware proxy mechanism, the middleware proxy mechanism redirecting the data read request to one of the optimized data replicas.

* * * * *